US005431020A

United States Patent [19]

Maghon

[11] Patent Number: 5,431,020

[45] Date of Patent: Jul. 11, 1995

[54] CERAMIC HEAT SHIELD ON A LOAD-BEARING STRUCTURE

[75] Inventor: Helmut Maghon, Mülheim an der Ruhr, Germany

[73] Assignee: Siemens Aktiengesellschaft, Munich, Germany

[21] Appl. No.: 333,599

[22] Filed: Nov. 2, 1994

Related U.S. Application Data

[63] Continuation of Ser. No. 70,548, Jun. 1, 1993, abandoned.

[30] Foreign Application Priority Data

Nov. 29, 1990 [WO] WIPO ............... PCT/DE90/00919

[51] Int. Cl.[6] ........................... F02C 7/00; F16D 1/00

[52] U.S. Cl. ..................................... 60/753; 60/39.32; 403/179; 403/387; 403/404

[58] Field of Search ...................... 60/752, 753, 39.31, 60/39.32; 110/336, 339; 403/179, 387, 397, 404; 52/508, 509

[56] References Cited

U.S. PATENT DOCUMENTS

| | | | |
|---|---|---|---|
| H528 | 10/1988 | Bruchez et al. | 60/753 |
| 2,548,485 | 4/1951 | Lubbock | 60/753 |
| 2,849,756 | 9/1958 | Gundel et al. | 52/509 |
| 2,910,155 | 10/1959 | Bradner | 52/509 |
| 2,915,877 | 12/1959 | Darling | 60/753 |
| 5,083,424 | 1/1992 | Becker | 60/39.32 |

FOREIGN PATENT DOCUMENTS

| | | |
|---|---|---|
| 1173734 | 7/1964 | Germany . |
| 2523449 | 3/1981 | Germany . |
| 3625056 | 1/1988 | Germany . |
| 2075659 | 11/1981 | United Kingdom . |
| 8912789 | 12/1989 | WIPO . |

OTHER PUBLICATIONS

International Search Report PCT/DE91/00905 Feb. 1991 (German).

*Primary Examiner*—Timothy S. Thorpe

*Attorney, Agent, or Firm*—Herbert L. Lerner; Laurence A. Greenberg

[57] ABSTRACT

In a heat shield on a load-bearing structure, the heat shield has a multiplicity of tiles which are in contact with the load-bearing structure, are adjacent one another for substantially covering an area and are fastened by means of approximately L-shaped metallic restraints that are anchored in grooves of the load-bearing structure. The restraints may be completely screened by hot sides of the tiles facing towards a hot fluid. It is also possible to avoid the use of expensive fastening devices for the restraints. The configuration of the heat shield on the load-bearing structure is very highly thermally load-resistant, simple to manufacture and does not expose the tiles to any stresses which could be critical with respect to the brittleness of the ceramic.

23 Claims, 3 Drawing Sheets

CERAMIC HEAT SHIELD ON A LOAD-BEARING STRUCTURE

CROSS-REFERENCE TO RELATED APPLICATION

This is a continuation, of application Ser. No. 08/070,548, filed Jun. 1, 1993, now abandoned, which is a Continuation of International Application Ser. No. PCT/DE91/00905, filed Nov. 18, 1991.

SPECIFICATION

The invention relates to a ceramic heat shield on a load-bearing structure, wherein the heat shield has a multiplicity of tiles which are disposed adjacent one another for substantially covering an area and are fastened on the load-bearing structure by means of metallic restraints.

Such heat-shield protected load-bearing structures are used in many ways, for example as flame tubes or hot gas ducts in combustion equipment, such as gas turbine installations. Corresponding heat-shield protected load-bearing structures are described in German Published, Prosecuted Application DE-AS 11 73 734, German Patent DE 25 23 449 C3 and German Published, Non-Prosecuted Application DE 36 25 056 A1. In German Published, Prosecuted Application DE-AS 11 73 734, the heat shield includes profiled tiles which have flanks or lateral surfaces provided with grooves and in which each tile is firmly clamped between at least two restraints that engage in the grooves. The restraints have straps which are in contact, under the fastened tile, with the load-bearing structure and which are solidly connected to it. In German Published, Non-Prosecuted Application DE 36 25 056 A1, the tiles are provided with chamfered flanks or lateral surfaces and are directly in contact with the load-bearing structure to be protected from thermal loading. They are fastened by metallic clamps, each having a trapezoidal cross-section, which are laid in a V-shaped gap between each two tiles and clamped against the load-bearing structure by means of bolts or the like.

It should be emphasized that a disadvantage of the heat shield according to German Published, Prosecuted Application DE-AS 11 73 734, under certain circumstances, is that a hot fluid to be held away from the load-bearing structure can flow under the heat shield because the tiles necessarily have to be located at a distance from the load-bearing structure and that, furthermore, the changes in the spring force of the restraints caused by thermal loading cannot be taken into account to a sufficient extent. A flow of hot fluid under the heat shield may possibly lead to damage to the load-bearing structure. Not making full allowance for the changes in the spring force of the restraints due to thermal stressing can lead to the tiles becoming loose when the thermal loads are large or to excessive mechanical stressing on the tiles when the thermal loading is low. Although the heat shield according to German Published, Non-Prosecuted Application DE 36 25 056 A1 involves no danger due to flow underneath the tiles, because the tiles forming the heat shield are in direct contact with the load-bearing structure, the metallic fastening elements of the heat shield are, however, directly exposed to the hot fluid and limit the thermal resistance of the heat shield or, alternatively, necessitate special cooling measures.

It is accordingly an object of the invention to provide a ceramic heat shield on a load-bearing structure, which overcomes the hereinafore-mentioned disadvantages of the heretofore-known devices of this general type, which avoids impairment of the load-bearing structure due to hot fluid to the largest possible extent and in which the tile restraints are constructed and disposed in such a way that they reliably fix the tiles over the largest possible temperature range without excessive stresses and without expensive cooling or the like.

With the foregoing and other objects in view there is provided, in accordance with the invention, a combination, comprising a load-bearing structure and a heat shield on the load-bearing structure; the load-bearing structure having grooves or groove means formed thereon defining two opposite groove walls, a groove bottom and a groove opening of the load-bearing structure for each of the grooves; the heat shield having a multiplicity of tiles disposed adjacent one another for substantially covering an area, each of the tiles having a cold side in contact with the load-bearing structure, a hot side facing away from the load-bearing structure, and at least two lateral surfaces each connecting the cold side to the hot side; metallic restraints fastening the tiles on the load-bearing structure, at least one of the restraints being associated with each respective one of the lateral surfaces; each of the restraints having an engagement strap at least partially reaching over the lateral surface; and each of the restraints having a fastening strap being directed approximately at right angles to the engagement strap and being fastened in a respective one of the grooves.

According to the invention, grooves are provided in the load-bearing structure and the restraints used for fastening the tiles are fixed in these grooves. In this way, the tiles can be laid directly on the load-bearing structure and the danger of flow under them is avoided. Although ducts remain between the tiles and the load-bearing structure in the form of the grooves covered by the tiles, it is possible to prevent a hot fluid flowing over the hot sides of the tiles from penetrating into the grooves by means of suitable dimensioning and spatial direction of the grooves, and possibly by taking further measures. The invention also permits the complete avoidance of metallic fastening elements located on the hot sides of the tiles. Finally, the loads imposed on the tiles by the restraints are essentially compressive stresses which are not critical with respect to the brittleness of the ceramic. Dangerous shear and tensile stresses are almost completely avoided.

The invention also permits substantial simplification in the fastening of the restraints in the load-bearing structure. Therefore, in accordance with another feature of the invention, each groove wall of each groove has a retention slot extending parallel to the bottom of the groove in the region of the bottom of the groove. A restraint with a restraint key on the fastening strap located at a distance from the engagement strap engages in the retention slot. It is no longer necessary to fasten the restraints with bolts or the like. The application of a restraint is limited to pushing the restraint keys into the retention slots of the groove walls. The positional fixing of the restraint in the groove is effected by means of the friction of the cold side of the respective clamped tile on the load-bearing structure. This friction is usually more than sufficient because of the surface roughness of the ceramic material of the tile, which is usually unglazed.

Within the scope of the invention, it is also possible to protect the spring effect of the metallic restraints and to counter the danger of plastic deformation during installation and operation so that a certain protection against tiles becoming loose is achieved. In accordance with a further feature of the invention, for this purpose, each groove is provided with a stop strip on each groove wall in the region of the groove opening so that the width of the groove is somewhat reduced in the region of the groove opening. Each restraint is also given two stop edges on the fastening strap, each of which is associated with a stop strip, with the stop edges projecting beyond the associated stop strips. In this way, each stop edge abuts the corresponding stop strip when the engagement strap of the restraint is bent appropriately far out of the slots. In this way, the deformation of the restraint is limited and bending effects leading to plastic deformation can be excluded.

In accordance with an added feature of the invention, in the case of structured groove walls, each groove has an insertion opening into which the restraints can be laid and from which they can be introduced into the groove. This is equally important and advantageous for grooves having groove walls which have retention slots and/or stop strips.

In accordance with an additional feature of the invention, there is provided a distance piece in the form of a plate or the like in the groove between each two restraints. The positioning of the restraints in the grooves can be secured and improved in this way. For example, such a distance piece can be fastened on the bottom of the groove, and preferably bolted on or introduced by means of retention keys into retention slots. The introduction of a distance piece is particularly advantageous between two adjacent restraints associated with different tiles, because the distance between two restraints associated with the same tile is fixed by the tile itself.

In accordance with yet another feature of the invention, each tile is provided with an engagement groove on each flank or lateral surface and each restraint associated with the tile reaches over the flank or lateral surface only between the engagement groove and the cold side. In this way, metallic retention elements are located completely behind the hot sides of the tiles and the detrimental thermal effects on these retention elements are reduced to a minimum.

In accordance with yet a further feature of the invention, the load-bearing structures are axially symmetrical about an axis. The invention is of particular importance for such heat shields which may, for example, be cylindrical or conical structures.

In accordance with yet an added feature of the invention, each groove is disposed in a circular manner about the axis. The grooves therefore extend at right angles to the direction along which a hot fluid can flow past the heat shield. In this way, hot fluid which penetrates into the grooves is substantially prevented from flowing beneath the heat shield. In accordance with yet an additional feature of the invention, in order to further reduce the thermal load on the metallic restraints, which can be necessary as part of distinctly high-temperature applications, such as in the combustion chambers of gas turbine installations, the load-bearing structure can be provided with ducts for supplying a fluid through the load-bearing structure into the grooves. It is then advantageous to associate at least one duct with each restraint so that the restraint can be cooled by the fluid supplied through the duct. Since the fluid flows out between the tiles, it also shuts off the gap between the tiles and the grooves of the load-bearing structure against the hot fluid. In addition to cooling, it also advantageously "shuts off" the gaps.

In accordance with again another feature of the invention, the groove means are grooves formed in the load-bearing structure, for example by turning or milling. In this way, the manufacturing expenditure can be significantly reduced, in contrast to the equally possible construction of the groove means by the application of additional components to the load-bearing structure.

In accordance with again a further feature of the invention, the fastening strap of each of the restraints associated with each given one of the tiles is located under the cold side of the given tile.

In accordance with again an added feature of the invention, each of the grooves is located approximately at right angles to a flow direction along which a hot fluid, in particular a hot gas, can flow through the load-bearing structure.

In accordance with again an additional feature of the invention, the heat shield and the load-bearing structure are part of a combustion installation.

In accordance with a concomitant feature of the invention, the heat shield and the load-bearing structure are part of a gas turbine installation.

Other features which are considered as characteristic for the invention are set forth in the appended claims.

Although the invention is illustrated and described herein as embodied in a ceramic heat shield on a load-bearing structure, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
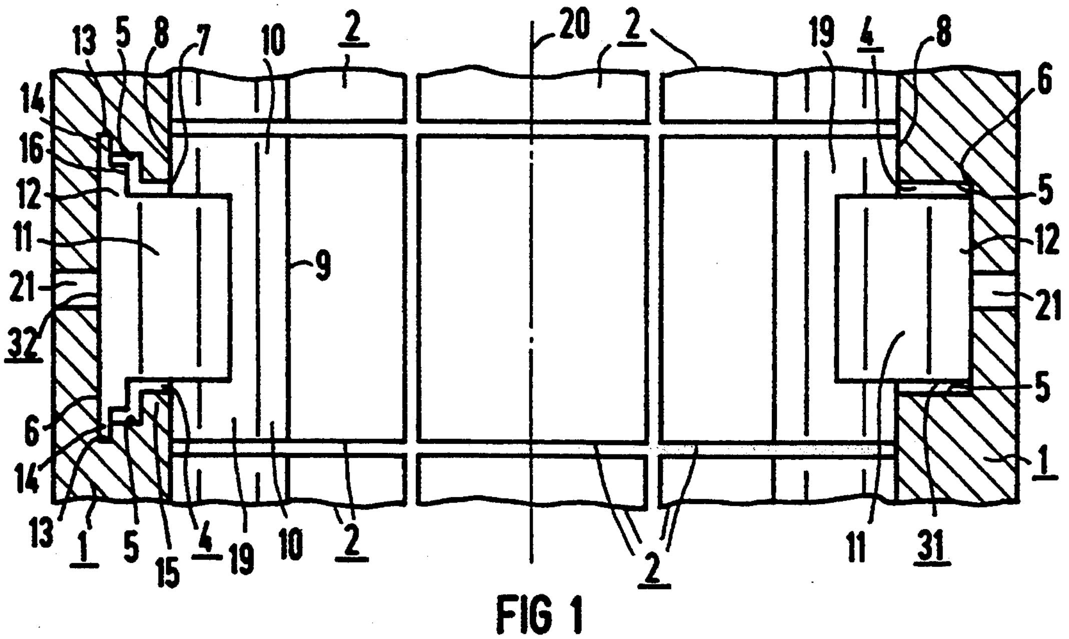
FIG. 1 is a fragmentary, diagrammatic, sectional view of an example with several possibilities for producing a ceramic heat shield on a load-bearing structure according to the invention.

Referring now in detail to the figures of the drawing, which are kept diagrammatic and/or slightly distorted where it is useful for emphasizing specific advantages of the invention, and first, particularly, to FIG. 1 thereof, there is seen a load-bearing structure 1 which is axially symmetrical about an axis 20 and on which, in accordance with the invention, tiles 2 are fastened by means of restraints 31, 32 in order to form a ceramic heat shield. Each restraint 31, 32 is located in a groove 4 which is machined into the load-bearing structure 1 or in groove means which are formed by the application of additional components to the load-bearing structure. Each groove or groove means 4 has two groove walls 5, a groove bottom 6 and a groove opening 7. The tiles 2 have a cold side 8 in contact with the load-bearing structure 1 and a hot side 9 facing away from the load-bearing structure 1. In addition, each tile 2 has two flanks or lateral surfaces 10 which connect the cold side 8 and the hot side 9 together. An engagement strap 11 of an associated restraint 31, 32 partially reaches over each flank or lateral surface 10. It is, of course, also possible for an engagement strap 11 to reach completely over a flank or lateral surface 10, i.e. as far as the hot side 9. In this way, however, the restraint 31, 32 is partially exposed and unprotected relative to the hot fluid which is guided through the load-bearing structure 1 along a flow direction substantially parallel to the axis 20. Under certain circumstances, this limits the load resistance of the heat shield. It is therefore particularly useful to introduce an engagement groove 19 in each flank or lateral surface 10, in which the engagement strap 11 of the associated restraint 31, 32 can engage while maintaining a certain distance from the hot side 9. The cold side 8 of each tile 2 lies substantially flat on the load-bearing structure 1 and is pressed onto the latter by the restraints 31, 32 so that the tile 2 is sufficiently fixed in its position because of friction between the ceramic cold side 8 and the metallic load-bearing structure 1. FIG. 1 shows two embodiment possibilities for the restraints 31, 32 and the groove 4. In the simplest case, as is shown on the right-hand side of FIG. 1, the groove 4 is of approximately rectangular cross-section and a fastening strap 12 of each restraint 31 is in contact with the groove bottom 6 and is fastened there, for example by means of bolts or the like. An extension of the restraint 32 and the groove 4 is shown on the left-hand side of FIG. 1. The fastening strap 12 of the restraint 32 has restraint keys 14 thereon which engage in retention slots 13 machined into the groove walls 5. In this way, the restraint 32 can be sufficiently anchored in the groove 4. In addition, the groove opening 7 on the left-hand side of FIG. 1 is constricted by stop strips 15 on both groove walls 5 so that each groove wall 5 acquires a somewhat stair-shaped form. Stop edges 16 on the restraint 32 correspond to the stop strips 15. If the restraint 32 on the engagement strap 11 is bent out from the groove 4 sufficiently far, which can occur during both installation and operation, the stop edges 16 abut against the stop strips 15 and prevent further movement of the engagement strap 11 out of the groove 4. This effectively counters plastic deformation of the restraint 32. In accordance with a special embodiment of the invention, the load-bearing structure 1 shown in FIG. 1 is provided with ducts 21 for the supply of a fluid into the restraints 31, 32. Through the use of this measure, the load resistance of the heat shield can be further increased, particularly in the case of distinctly high-temperature applications such as occur in the combustion chambers of gas turbine installations.

Figure 2:
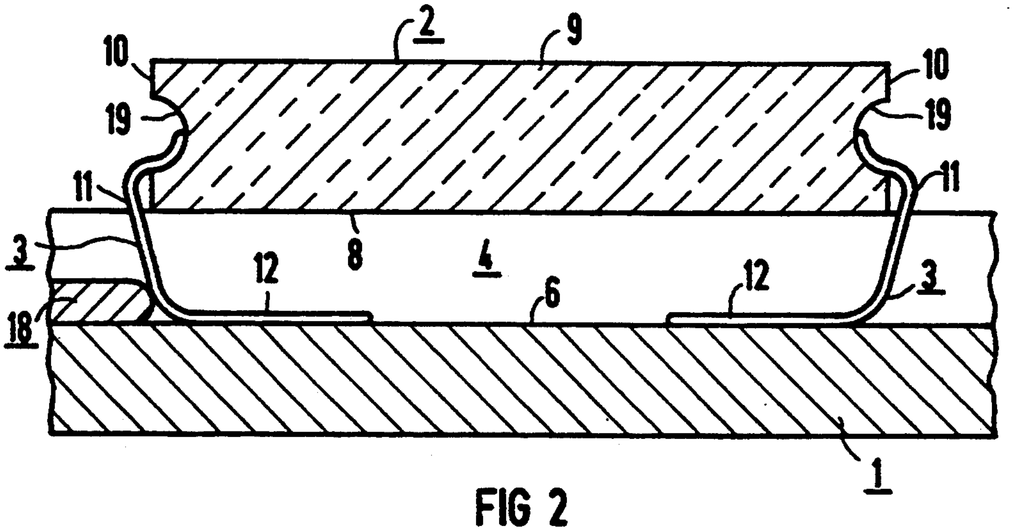
FIG. 2 is a fragmentary, sectional view of an example of clamping a tile according to the invention.

FIG. 2 shows details of the clamping of a tile 2 on a load-bearing structure 1. The tile 2 has the two opposite flanks or lateral surfaces 10 between the hot side 9 and the cold side 8, and these flanks or lateral surfaces are provided with the engagement grooves 19, in each of which an engagement strap 11 of an essentially L-shaped restraint 3 is engaged. In accordance with the invention, the restraints 3 are anchored in the groove 4 of the load-bearing structure 1 on fastening straps 12 which are in contact with the groove bottom 6. Fastening means, the selection and application of which lie within the competence of one of skill in the relevant field, are not shown. Both of the fastening straps 12 are disposed in such a way that they protrude under the tile 2 and are correspondingly protected by the latter from excessive thermal stressing. Also shown diagrammatically on the groove bottom 6 in FIG. 2 is a distance piece or spacer 18 which can be used to maintain a distance between the restraints 3 associated with different tiles 2.

Figure 3:
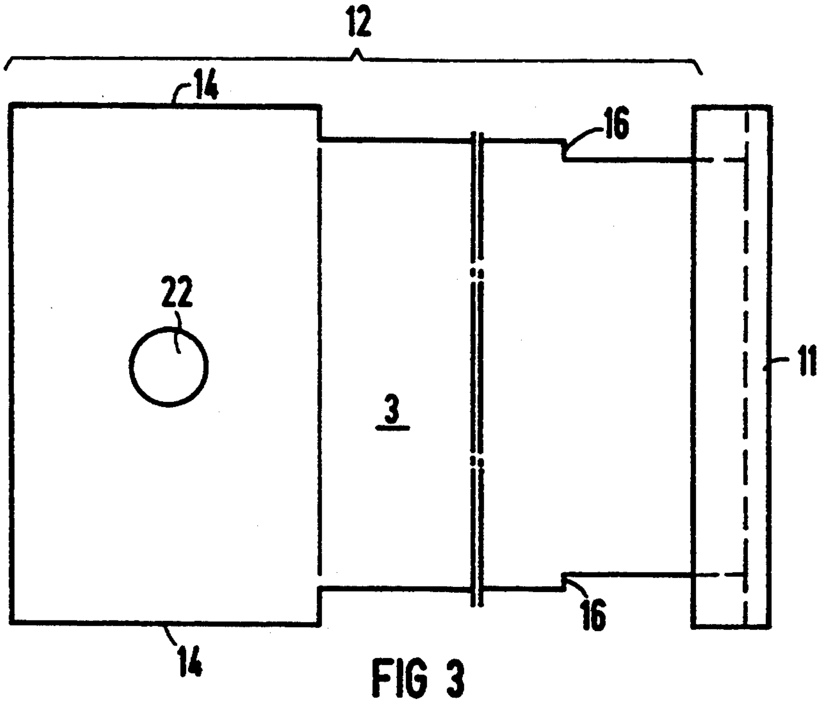
FIGS. 3, 4 and 5 are various views of a metallic restraint for a ceramic heat shield on a load-bearing structure according to the invention.
Figure 4:
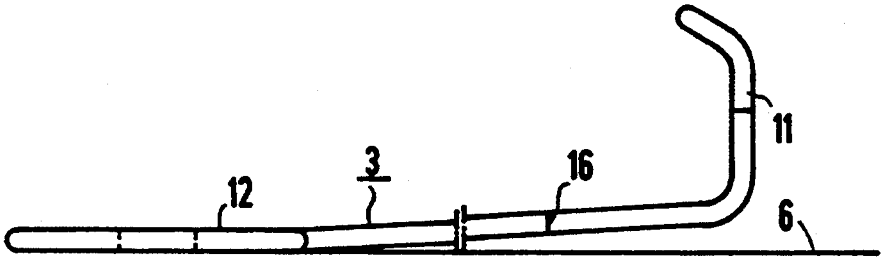
Figure 5:
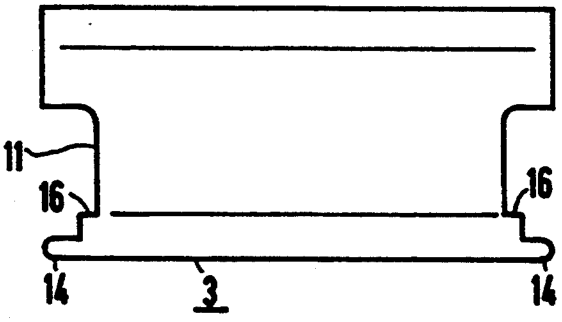

FIGS. 3, 4 and 5 show various views of a restraint 3. Reference will now be made to these three figures jointly for explanation purposes. Each restraint 3 has one of the fastening straps 12 at which the restraint is fastened to the groove bottom 6. This fastening can take place by means of a bolt which is inserted through a hole 22. However, it is useful for the fastening of the restraint 3 to take place by means of the restraint keys 14 which have to be pushed into the retention slots 13 shown in FIG. 1. In any event, the fastening of the restraint 3 takes place at a distance from the engagement strap 11 which stands out from the fastening strap 12 approximately at right angles in order to ensure sufficient elasticity in the fastening of the tile 2, as is also seen in FIG. 1. In order to ensure that the restraint 3 is not subjected to excessive bending during installation and/or operation, the fastening strap 12 is provided with the stop edges 16 which abut against the associated stop strips 15 in the correspondingly constructed groove 4 in the event of excessive bending, as is seen in FIG. 1.

Figure 6:
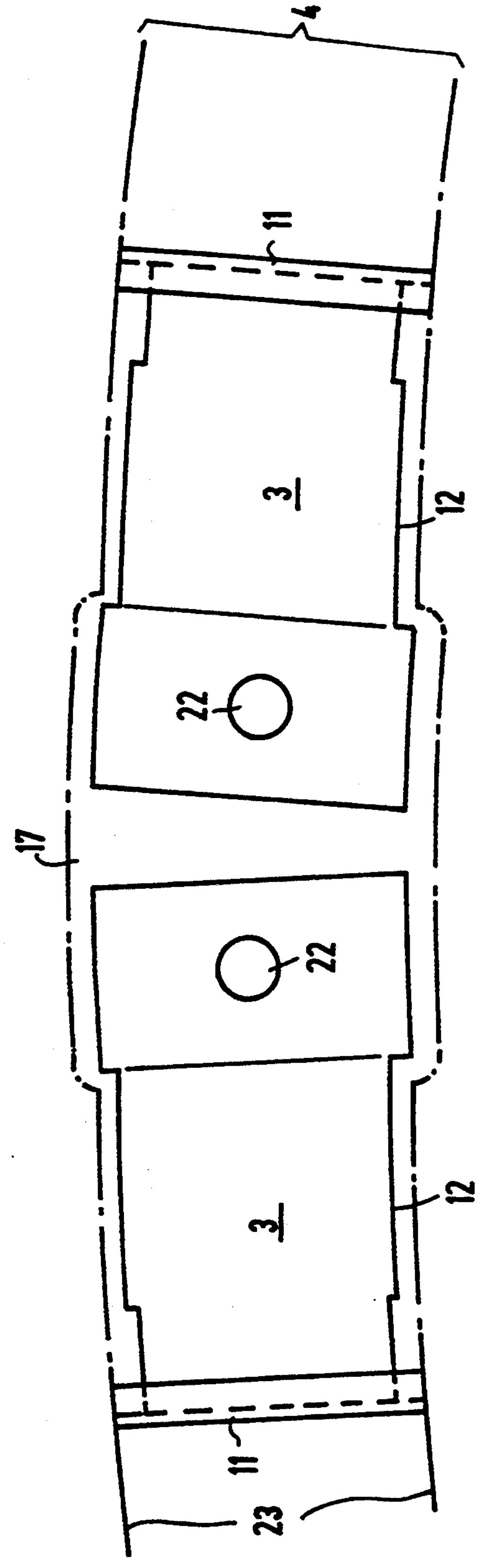
FIG. 6 shows is a view of metallic restraints for a conical heat shield on a load-bearing structure according to the invention.

FIG. 6 shows a further illustrative embodiment of restraints 3 in association with ceramic heat shields on load-bearing structures according to the invention. As already described, the invention not only permits the lining of planar or cylindrical structures, but also permits the sheathing of complicated load-bearing structures, for example those with a conical shape.

If a load-bearing structure has axial symmetry, the grooves can be machined out of the load-bearing structure, which is rotated about the axis defined by the axial symmetry. Under certain circumstances, however, the restraints 3 with essentially straight fastening straps 12 (shown in FIGS. 3, 4 and 5) could no longer be inserted in such grooves. The fastening straps 12 must be matched to the shape of the groove by arcuate or parallelogram-type shaping, as is shown in FIG. 6. In the case of grooves in conical load-bearing structures, the necessary fastening straps 12 can be curved along two guidelines 23, which in the particular case are concentric circles. In the case of fastening straps 12 that each come to lie under the tile to be fastened, a differently shaped restraint 3 is necessary for each flank or lateral surface of the tile. This is indicated in FIG. 6. The guidelines 23 are essentially planar developments of the curves describing the groove 4. In a certain sense, they therefore indicate the course of the groove 4. For completeness, a widening of the groove 4, in the form of an insertion opening 17 for introducing the restraints 3, is indicated. Independent of the type of fastening of the other restraints 3, the restraints 3 which come to rest in the insertion opening 17, must be fastened by means of bolts or the like which, for example, are fed through the corresponding holes 22.

The present invention creates a ceramic heat shield on a load-bearing structure in which the heat shield has a multiplicity of tiles that are fastened on the load-bearing structure by means of metallic restraints, and the mechanical and thermal load resistance of the heat shield is exceptionally high. The invention is particularly adapted to distinctly high-temperature applications, such as occur in modern gas turbine installations.

I claim:

1. A combination, comprising a load-bearing structure and a heat shield on said load-bearing structure for guiding a hot fluid through the load-bearing structure along a flow direction parallel to an axis thereof;

a) said load-bearing structure having groove means formed thereon defining two opposite groove walls, a groove bottom and a groove opening of said load-bearing structure for each of said groove means;

b) said heat shield having a multiplicity of heat shield tiles disposed adjacent one another for substantially covering an area, each of said tiles having a cold side in contact with said load-bearing structure, a hot side facing away from said load-bearing structure, and at least two lateral surfaces each connecting said cold side to said hot side;

c) metallic restraints fastening said tiles on said load-bearing structure, at least one of said restraints being associated with each respective one of said lateral surfaces;

d) each of said restraints having an engagement strap at least partially reaching over said lateral surface; and e) each of said restraints having a fastening strap being directed approximately at right angles to said engagement strap and being fastened in a respective one of said groove means.

2. A combination, comprising a load-bearing structure and a heat shield on said load-bearing structure;

said load-bearing structure having groove means formed thereon defining two opposite groove walls, a groove bottom and a groove opening of said load-bearing structure for each of said groove means;

said heat shield having a multiplicity of heat shield tiles disposed adjacent one another for substantially covering an area, each of said tiles having a cold side in contact with said load-bearing structure, a hot side facing away from said load-bearing structure, and at least two lateral surfaces each connecting said cold side to said hot side; metallic restraints fastening said tiles on said load-bearing structure, at least one of said restraints being associated with each respective one of said lateral surfaces;

each of said restraints having an engagement strap at least partially reaching over said lateral surface; and each of said restraints having a fastening strap being directed approximately at right angles to said engagement strap and being fastened in a respective one of said groove means, wherein:

a) each of said groove walls in each of said groove means has a retention slot being formed therein in the vicinity of said groove bottom and extending approximately parallel to said groove bottom;

b) each of said restraints has two restraint keys on said fastening strap being disposed at a distance from said engagement strap; and c) one of said restraint keys of each of said restraints is engaged in said retention slot of each respective one of said groove means.

3. A combination, comprising a load-bearing structure and a heat shield on said load-bearing structure;

said load-bearing structure having groove means formed thereon defining two opposite groove walls, a groove bottom and a groove opening of said load-bearing structure for each of said groove means;

said heat shield having a multiplicity of heat shield tiles disposed adjacent one another for substantially covering an area, each of said tiles having a cold side in contact with said load-bearing structure, a hot side facing away from said load-bearing structure, and at least two lateral surfaces each connecting said cold side to said hot side;

metallic restraints fastening said tiles on said load-bearing structure, at least one of said restraints being associated with each respective one of said lateral surfaces;

each of said restraints having an engagement strap at least partially reaching over said lateral surface; and each of said restraints having a fastening strap being directed approximately at right angles to said engagement strap and being fastened in a respective one of said groove means, wherein:

a) each of said groove walls in each of said groove means has a stop strip in the vicinity of said groove opening;

b) each of said fastening straps of said restraints has two stop edges disposed thereon, one of said stop edges being associated with each respective one of said stop strips; and c) said stop edges project beyond said associated stop strips.

4. The combination heat shield and load-bearing structure according to claim 2, wherein said load-bearing structure has insertion openings formed therein, and each of said insertion openings is associated with a respective one of said groove means for laying said restraints into said insertion openings and introducing said restraints from said insertion openings into a respective one of said groove means.

5. The combination heat shield and load-bearing structure according to claim 2, including distance pieces each being disposed in a respective one of said groove means between a respective two of said restraints.

6. The combination heat shield and load-bearing structure according to claim 2, wherein:

a) each of said tiles has engagement grooves formed therein, each of said engagement grooves being formed in a respective one of said lateral surfaces; and b) said engagement strap of each of said restraints reaches over said lateral surface between one of said engagement grooves and said cold side.

7. The combination heat shield and load-bearing structure according to claim 2, wherein said load-bearing structure is axially symmetrical about an axis.

8. The combination heat shield and load-bearing structure according to claim 7, wherein each of said groove means is formed circularly about the axis.

9. The combination heat shield and load-bearing structure according to claim 2, wherein:

a) said load-bearing structure has ducts formed therein emerging into said groove bottoms, for supplying a cooling fluid; and b) at least one of said ducts is associated with each respective one of said restraints, for cooling said restraints with the cooling fluid supplied through said ducts.

10. The combination heat shield and load-bearing structure according to claim 2, wherein said groove means are grooves formed onto said load-bearing structure.

11. The combination heat shield and load-bearing structure according to claim 2, wherein said fastening strap of each of said restraints associated with each given one of said tiles is located under said cold side of said given tile.

12. The combination heat shield and load-bearing structure according to claim 2, wherein each of said groove means is located approximately at right angles to a flow direction along which a hot fluid, in particular a hot gas, can flow through said load-bearing structure.

13. In a gas turbine installation, a combination, comprising a heat shield and a load bearing structure for guiding a hot fluid through the load-bearing structure along a flow direction parallel to an axis thereof;

a) said load-bearing structure having groove means formed thereon defining two opposite groove walls, a groove bottom and a groove opening of said load-bearing structure for each of said groove means;

b) said heat shield having a multiplicity of tiles disposed adjacent one another for substantially covering an area, each of said tiles having a cold side in contact with said load-bearing structure, a hot side facing away from said load-bearing structure, and at least two lateral surfaces each connecting said cold side to said hot side;

c) metallic restraints fastening said tiles on said load-bearing structure, at least one of said restraints being associated with each respective one of said lateral surfaces;

d) each of said restraints having an engagement strap at least partially reaching over said lateral surface; and e) each of said restraints having a fastening strap being directed approximately at right angles to said engagement strap and being fastened in a respective one of said groove means.

14. In a combustion installation, a combination, comprising a heat shield and a load bearing structure for guiding a hot fluid through the load-bearing structure along a flow direction parallel to an axis thereof;

a) said load-bearing structure having groove means formed thereon defining two opposite groove walls, a groove bottom and a groove opening of said load-bearing structure for each of said groove means;

b) said heat shield having a multiplicity of tiles disposed adjacent one another for substantially covering an area, each of said tiles having a cold side in contact with said load-bearing structure, a hot side facing away from said load-bearing structure, and at least two lateral surfaces each connecting said cold side to said hot side;

c) metallic restraints fastening said tiles on said load-bearing structure, at least one of said restraints being associated with each respective one of said lateral surfaces;

d) each of said restraints having an engagement strap at least partially reaching over said lateral surface; and e) each of said restraints having a fastening strap being directed approximately at right angles to said engagement strap and being fastened in a respective one of said groove means.

15. The combination heat shield and load-bearing structure according to claim 3, wherein said load-bearing structure has insertion openings formed therein, and each of said insertion openings is associated with a respective one of said groove means for laying said restraints into said insertion openings and introducing said restraints from said insertion openings into a respective one of said groove means.

16. The combination heat shield and load-bearing structure according to claim 3, including distance pieces each being disposed in a respective one of said groove means between a respective two of said restraints.

17. The combination heat shield and load-bearing structure according to claim 3, wherein:

a) each of said tiles has engagement grooves formed therein, each of said engagement grooves being formed in a respective one of said lateral surfaces; and b) said engagement strap of each of said restraints reaches over said lateral surface between one of said engagement grooves and said cold side.

18. The combination heat shield and load-bearing structure according to claim 3, wherein said load-bearing structure is axially symmetrical about an axis.

19. The combination heat shield and load-bearing structure according to claim 18, wherein each of said groove means is formed circularly about the axis.

20. The combination heat shield and load-bearing structure according to claim 3, wherein:

a) said load-bearing structure has ducts formed therein emerging into said groove bottoms, for supplying a cooling fluid; and b) at least one of said ducts is associated with each respective one of said restraints, for cooling said restraints with the cooling fluid supplied through said ducts.

21. The combination heat shield and load-bearing structure according to claim 3, wherein said groove means are grooves formed onto said load-bearing structure.

22. The combination heat shield and load-bearing structure according to claim 3, wherein said fastening strap of each of said restraints associated with each given one of said tiles is located under said cold side of said given tile.

23. The combination heat shield and load-bearing structure according to claim 3, wherein each of said groove means is located approximately at right angles to a flow direction along which a hot fluid, in particular a hot gas, can flow through said load-bearing structure.

* * * * *